(12) United States Patent
Parks et al.

(10) Patent No.: US 8,653,440 B2
(45) Date of Patent: Feb. 18, 2014

(54) SENSOR AND HOUSING IN A REPLICATING SYSTEM TO FACILITATE DETECTION OF OBJECTS USING ELECTROMAGNETIC RADIATION

(75) Inventors: Ian Parks, St. Albans (GB); David Thomas, High Wycombe (GB); Jeff Ellis, Welwyn Garden City (GB); David Walker-Sharpe, High Wycombe (GB)

(73) Assignee: Xerox Corporation, Norwalk, CT (US)

( * ) Notice: Subject to any disclaimer, the term of this patent is extended or adjusted under 35 U.S.C. 154(b) by 350 days.

(21) Appl. No.: 12/140,696

(22) Filed: Jun. 17, 2008

(65) Prior Publication Data

US 2009/0309012 A1    Dec. 17, 2009

(51) Int. Cl.
*H01J 5/02*    (2006.01)
*G06M 7/00*    (2006.01)

(52) U.S. Cl.
USPC .......................................... 250/239; 250/221

(58) Field of Classification Search
USPC ............ 250/221, 239, 559.38, 559.4, 559.29, 250/559.01, 222.1, 216, 224, 548, 237 R, 250/551; 356/3.01, 3.06; 355/97, 104–111; 347/108, 109, 101, 104, 105; 340/501, 340/540, 568.1, 600, 693.5
See application file for complete search history.

(56) References Cited

U.S. PATENT DOCUMENTS

| | | | |
|---|---|---|---|
| 3,621,268 A * | 11/1971 | Friedrich et al. | 250/214.1 |
| 3,862,415 A * | 1/1975 | Harnden et al. | 250/221 |
| 4,919,410 A | 4/1990 | Robinson, Jr. et al. | |
| 4,937,764 A * | 6/1990 | Komatsu et al. | 702/137 |
| 5,098,074 A | 3/1992 | Mandel et al. | |
| 5,103,085 A * | 4/1992 | Zimmerman | 250/221 |
| 5,945,664 A * | 8/1999 | Ogura | 250/208.1 |
| 6,176,480 B1 * | 1/2001 | Yonenuma et al. | 270/58.08 |
| 6,246,859 B1 * | 6/2001 | Takemura et al. | 399/371 |
| 6,642,505 B1 * | 11/2003 | Nakano et al. | 250/221 |
| 6,791,100 B2 * | 9/2004 | Dye | 250/559.4 |
| 6,794,633 B2 * | 9/2004 | Iwasaki | 250/221 |
| 7,476,848 B2 * | 1/2009 | Argast et al. | 250/239 |

OTHER PUBLICATIONS

Invention Proposal.

* cited by examiner

*Primary Examiner* — Que T Le
*Assistant Examiner* — Jennifer Bennett
(74) *Attorney, Agent, or Firm* — Hoffmann & Baron, LLP

(57) ABSTRACT

Exemplary embodiments can be used in a replicating system to guide source electromagnetic waves, such as infrared (IR) radiation, from an emitter of a reflective-type sensor towards an object held on a support mechanism and to guide reflected electromagnetic waves that are related to the source electromagnetic waves to a receiver of the reflective-type sensor. The height of the support mechanism can be adjusted based on whether the object is detected.

16 Claims, 4 Drawing Sheets

SENSOR AND HOUSING IN A REPLICATING SYSTEM TO FACILITATE DETECTION OF OBJECTS USING ELECTROMAGNETIC RADIATION

BACKGROUND

1. Technical Field

The present invention is directed to sensors for detecting objects using electromagnetic radiation, and specifically to a housing for use with reflective optosensors.

2. Brief Discussion of Related Art

Optosensors are used in a broad range of applications. Typically, optosensors emit electromagnetic radiation, such as infrared (IR) radiation. The radiation emitted can be used to detect the presence or absence of an object in the path of the electromagnetic radiation. When an object is present, the electromagnetic radiation impinges on the object and some of the electromagnetic radiation is reflected back to the sensor. When no object is present, the electromagnetic radiation is not reflected.

While these sensors are typically accurate in detecting the presence or absence of an object, these sensors can be prone to false positives due to particles or contaminants that have accumulated in the path of the electromagnetic radiation. These sensors can detect the particles or contaminants and mistake the particles or contaminants for the object that the sensor is configured to detect, especially where the particles and contaminates are composed of the same or similar material as the object. When these sensors are implemented in a system that depends on accurate detection of objects for proper operation, false positives can have a detrimental affect on the system's operation In copier applications, optosensors can be used to detect the presence or absence of one or more sheets paper throughout the paper path. In these applications, the operation of the copier can depend on whether a sheet is paper is present or not. For example, sensors can be used to indicate that a paper tray is empty, there is a paper jam, or that a stack of paper in an output tray is at certain height. In these applications, paper dust can accumulate in the path of the IR radiation, which can result in the generation of a signal by optosensor that indicates the presence of a sheet of paper when no sheet of paper is present (i.e. a false positive).

SUMMARY OF EXEMPLARY EMBODIMENTS

According to aspects illustrated herein, there is provided a system for replicating information. The system includes a reflective-type sensor, a housing, and a support mechanism. The reflective-type sensor detects whether an object is present. The reflective-type sensor has an emitter for radiating a source electromagnetic wave and a receiver for receiving a reflected electromagnetic wave related to the source electromagnetic wave. The housing has a divider that divides the housing into an emission section through which the source electromagnetic wave radiates and a reception section through which the reflected electromagnetic wave radiates. The divider is substantially impermeable to the source electromagnetic wave to prevent the source electromagnetic wave from entering the reception section. The support mechanism holds the object. The sensor is disposed at a proximate end of the housing and the source electromagnetic wave emitted by the emitter radiates through the emission section towards a distal end of the housing, where the housing is positioned with respect to the support mechanism so that the source electromagnetic wave radiates towards a location where the object is expected to be.

According to other aspects illustrated herein, there is provided a method of detecting objects. The method includes radiating source electromagnetic waves through an emission section of a housing. The source electromagnetic waves are guided through the emission section by at least a divider in the housing, where the divider is substantially impermeable to the source electromagnetic waves. The method also includes determining whether an object is present on a support mechanism based on whether reflected electromagnetic waves are received through a reception section of the housing. The reflected electromagnetic waves are guided through the reception section by at least the divider. The method further includes performing at least one of adjusting a height of the support mechanism based one a determination of whether the object is present or indicating that the object is depleted based on a determination of whether the object is present.

According to still other aspects, there is provided herein a device for facilitating object detection. The device includes a housing extending from a proximate end to a distal end. The housing has a cavity within which a divider is disposed to separate the cavity into an emission section for radiating a source electromagnetic wave therethrough and a reception section for radiating a reflected electromagnetic wave therethrough. The reflected electromagnetic wave is related to the source electromagnetic wave. The divider is substantially impermeable to the source electromagnetic wave to prevent the source electromagnetic wave from entering the reception section. The distal end of housing extends beyond a distal edge of the divider by at least about 1 millimeter and by as much as about 6 millimeters.

DETAILED DESCRIPTION

Figure 1:
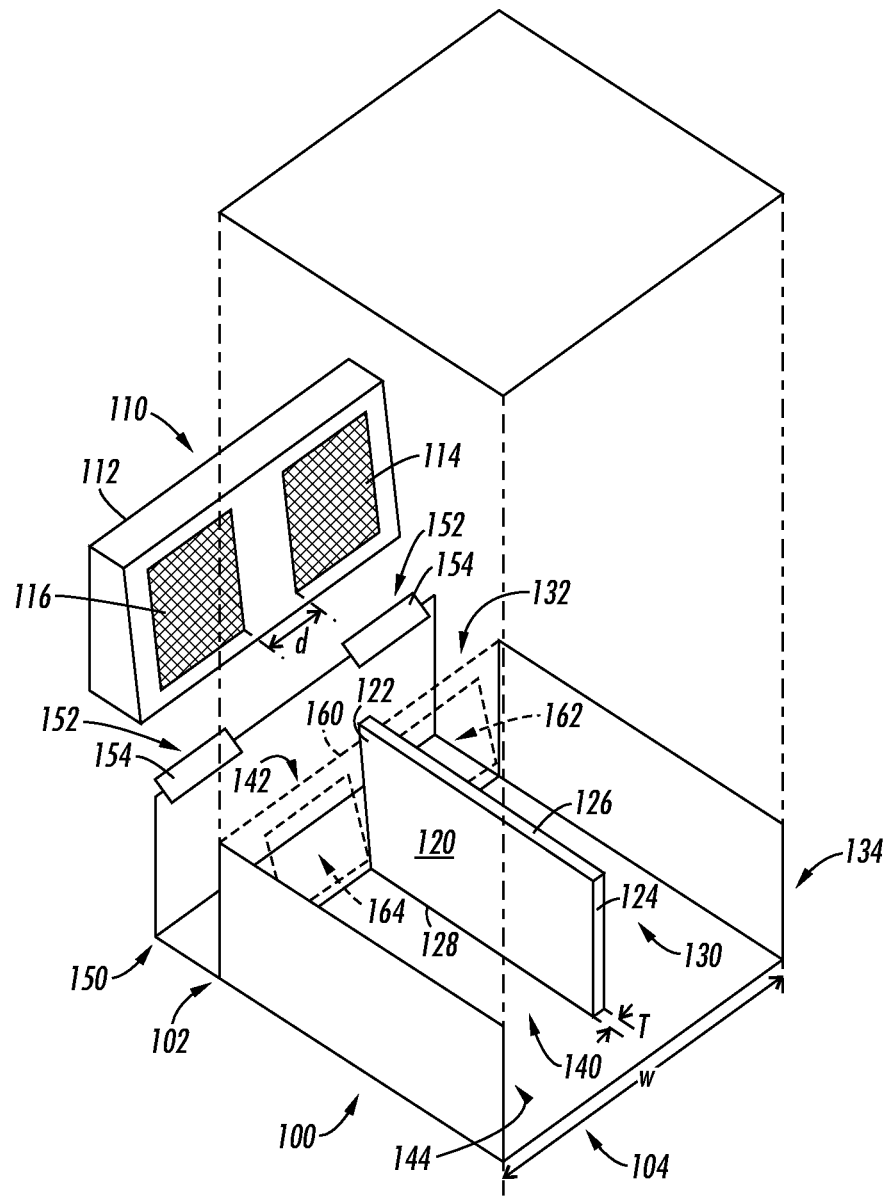
FIG. 1 depicts an exploded perspective view of an exemplary embodiment a housing and a sensor.

Exemplary embodiments can be used to guide source electromagnetic waves, such as infrared (IR) radiation, from an emitter of a reflective-type sensor towards an object to be detected and to guide reflected electromagnetic waves that are related to the source electromagnetic waves to a receiver of the reflective-type sensor. Exemplary embodiments can include a housing that is divided into at least two sections. A first one of the sections can be an emission section through which source electromagnetic waves emitted by the emitter can radiate. A second one of the sections can be a reception section through which reflected electromagnetic waves radiate.

As used herein, "electromagnetic waves" refer to energy that is propagated as undulating electric and magnetic fields having a frequency within the electromagnetic spectrum. Electromagnetic waves can include radio wave, infrared, visible light, ultraviolet, X-rays, gamma rays, and the like. "Source electromagnetic waves" refer to electromagnetic waves emitted by a sensor and "reflected electromagnetic waves" refer to source electromagnetic waves that that have been reflected by an object.

As used herein, "emission section" refers to a region, area, channel, or path through which source electromagnetic waves radiate and "reception section" refers to a region, area, channel, or path through which reflected electromagnetic waves radiate.

As used herein, a "divider" refers to a barrier that substantially impermeable to source electromagnetic waves, where "impermeable" refers to the ability of a material to prevent electromagnetic radiation from passing therethrough.

As used herein, "medium" refers to matter, such as gases, liquids, solids, and the like. Exemplary mediums can be air or objects, such as paper.

As used herein, a "housing" refers to a elongated body having a cavity through which electromagnetic waves can radiate, where a "cavity" refers to a hollowed space that can be filled with a medium, such as air.

As used herein, an "object" refers to matter that is detectable using source electromagnetic waves emitted from a sensor. An object can be substrate media, a tangible medium, printouts, and the like. An exemplary object can be one or more sheets of paper.

As used herein, "printout" refers to the reproduction of replicated information on "substrate media", which refers to, for example, paper, transparencies, parchment, film, fabric, plastic, or other substrates on which information can be reproduced.

As used herein, "tangible medium" refers to a medium that has features which can be replicated and reproduced on substrate media using a replication technique.

As used herein, a "support mechanism" refers to a structure that can hold one or more objects. Exemplary support mechanisms can include a substrate media holder, a tray, such as a printout tray, or other structure throughout the paper path that can support an object, where "paper path" refers to path followed to generate a printout from a substrate media.

As used herein, "contaminants" and "particles" refers to matter having the same or similar composition as that of an object. Detection of contaminants and particles by a sensor is generally undesirable. An exemplary contaminant or particle can be one or more fragments of paper, which are referred to herein as "paper dust."

As used herein, an "emitter" refers to a source on a sensor from which electromagnetic waves radiate.

As used herein, a "receiver" refers to a component that receives or otherwise detects electromagnetic radiation.

As used herein, a "reflective-type sensor" refers to a device that includes an emitter and a receiver, where the emitter radiates source electromagnetic waves and the receiver receives reflected electromagnetic waves as a result of the source electromagnetic waves impinging upon an object.

As used herein, "replication" refers to recording and reproducing information or reproducing previously recorded information. "Electrostatographic replication" refers to forming and using electrostatic charged patterns to record and reproduce information. "Xerographic replication" refers to the use of a resinous powder on an electrically charged plate record and reproduce information. "Digital imaging replication" refers to recording and reproducing information using a photosensive sensor to convert light into electric charge, which is subsequently converted into a digital signal.

As used herein, "flush" refers to arranging surfaces and/or edges close together or in contact.

FIG. 1 illustrates an exemplary housing 100 having a proximate end 102 and a distal end 104. The housing 100 can be operatively coupled to a reflective-type sensor 110 (hereinafter "sensor 110"). The sensor 110 can have a body 112 and can be an optosensor that emits electromagnetic waves, such as IR radiation, from an emitter 114 and receives reflected electromagnetic waves with a receiver 116. The emitter 114 and receiver 116 can be separated on the body 112 by a distance d. The sensor 110 can be configured to emit and detect electromagnetic waves of a specified wavelength based on its intended application. For example, the sensor 110 can be configured using IR radiation having a wavelength suitable for detecting paper (white, grey, or other colored paper).

The housing 100 can include a divider 120, an emission section 130, a reception section 140, and a sensor holder section 150. The housing 100 can be an elongated hollow body extending from the proximate end 102 to the distal end 104. The housing 100 is formed from a material that is substantially impermeable to the source electromagnetic waves, such as IR radiation, emitted from the emitter 114. An exemplary material that can be used to form the housing can include black acrylonitrile-butadienestyrene (ABS) plastic of a specified thickness. The housing can function to prevent external electromagnetic radiation (e.g. electromagnetic radiation detectable by the sensor 110 that did not originate from the sensor 110) from interfering with the operation of the sensor 110, when the sensor is operative coupled to the housing 100.

The divider 120 can be located within the cavity formed by the housing 100 and can partition the cavity of the housing into at least two sections. A first one of the sections can be the emission section 130 and a second one of the sections can be the reception section 140. The divider 120 can have a proximate edge 122, a distal edge 124 and longitudinal edges 126 and 128. In some embodiments, the proximate edge 122 can coincide with the proximate end 102 of the housing 100 so that there is substantially no space between the proximate edge 122 of the divider 120 and the proximate end 102 of the housing 100. The longitudinal edges 126 and 128 can be operatively coupled to opposing longitudinal surfaces of the housing 100. The divider 120 can extend longitudinal within the cavity formed by the housing 100 from the proximate edge 122 to the distal edge 124 to form a wall that establishes a channel corresponding to the emission section 130 and a channel corresponding to the reception section 140.

The distal edge 124 of the divider 120 can be recessed within the cavity of the housing 100 so that the emission section 130 and the reception section 140 do not extend the length of the housing 100. In some embodiments, different portions of the distal edge 124 can be recessed at different distances from the distal end 104 of the housing 100. In some embodiments, the housing 100 can extend beyond the distal edge 124 of the divider 120 by about 1 millimeter to about 6 millimeters or about 2 millimeters to about 4 millimeters. The divider 120 can be formed of a material that is substantially impermeable to the source electromagnetic waves emitted by the sensor 110. The divider 120 can be formed from the same or different material as the housing, such as black ABS plastic, with a thickness T sufficient to prevent IR radiation from passing through the divider 120. In some embodiments, the divider can have a thickness T of at least about 1.5 millimeters or about 2 millimeters.

The emission section 130 can be formed between an inner surface of the housing 100 and the divider 120 so that the emission section 130 forms a channel having openings 132 and 134 at the proximate end 102 and the distal end 104, respectively. Source electromagnetic waves can be emitted from the emitter 114 of the sensor 110 and can radiate through the opening 132 into the emission section 130. The inner surface of housing 100 and the divider 120 can guide the source electromagnetic waves through the emission section 130 and towards the opening 134 at the distal end 104. When a detectable object is present within the range of the sensor 110, at least a portion of the source electromagnetic waves are reflected.

The reception section 140 can be formed adjacently to the emission section 130, between an inner surface of the housing 100 and the divider 120, so that the reception section 140 forms a channel having openings 142 and 144 at the proximate end 102 and the distal end 104, respectively. Reflected electromagnetic waves can radiate off of an object and through the opening 144 into the reception section 140. The inner surface of housing 100 and the divider 120 can guide the reflected electromagnetic waves through the reception section 140 and towards the opening 132 at the proximate end 102. The reflected electromagnetic waves can radiate through the opening 132 and impinge upon the receiver 116 of the sensor 110 when the sensor is operatively coupled to the housing 100.

The sensor holder section 150 (hereinafter "holder 150") can be formed to receive the sensor 110 so that the emitter 114 and the receiver 116 align with the opening 132 and 142, respectively. At least a portion of the sensor body 112 can be flush with the proximate end 102 of the housing 100 so that the proximate edge 122 of the divider 120 is substantially flush with the sensor body 112 between the emitter 114 and the receiver 116. Such a configuration can ensure that the source electromagnetic waves emitted by the emitter 130 radiate through the opening 132 into the emission section 130 and towards the opening 134 and can prevent the source electromagnetic waves form radiating through the reception section 140.

The holder 150 can include a locking mechanism 152 to selectively lock the sensor 110 in place and to prevent the sensor 110 from shifting. The locking mechanism can include clamping sections 154 or other suitable structures or fastening mechanisms for holding the sensor 110 in place. The clamping sections 154 can be formed from a resilient material, such as plastic, metal, or the like, to provide slight pressure on the sensor 110 when the sensor 110 is position in the holder 150.

In some embodiments, the housing 100 can have a proximate surface 160 that extends the width W of the housing 100 and that is located at the proximate end 102 of the housing 100. The proximate surface 160 can include openings 162 and 164 to allow the emitter 114 and receiver 116 to emit and receive electromagnetic waves guided through the housing 100. In these embodiments, the proximate surface 160 can be substantially flush with the sensor body 112 when the sensor 110 is held by the holder 150 and the emitter 114 and receiver 116 of the sensor 110 can align with the openings 162 and 164, respectively. The proximate edge 122 of the divider 120 can be aligned between the emitter 114 and receiver 116 so that the divider 120 extends longitudinally away from the sensor body 112

In some embodiments, the housing 100 and the sensor 110 can be separate components configured to operatively interface with each other. In other embodiments, the housing 100 and the sensor 110 can be integrally formed. For example, in some embodiments, the sensor body 112 and the housing 100 are fabricated together.

Figure 2:
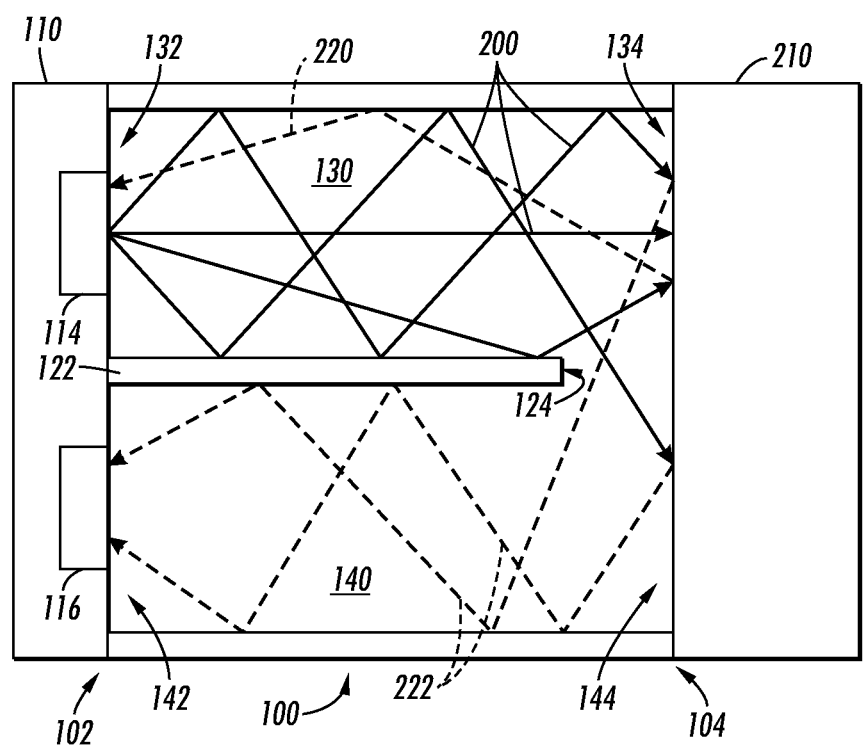
FIGS. 2 and 3 depict a cross-sectional view of a housing operatively coupled to a sensor to facilitate detection of objects.
Figure 3:
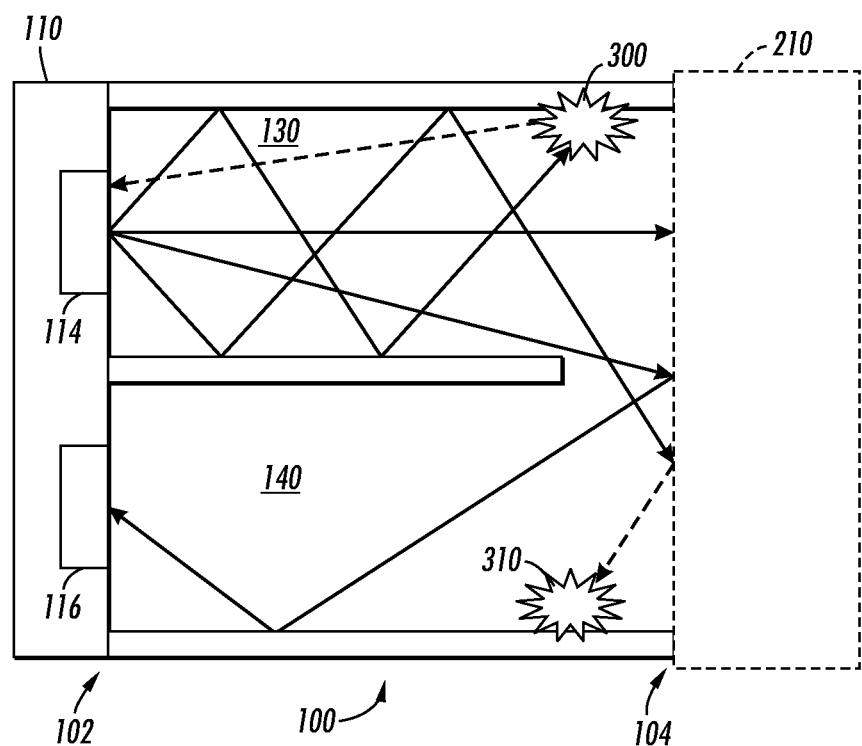

FIGS. 2 and 3 depict a cross-sectional view of the housing 100 and the sensor 110. Referring to FIG. 2, source electromagnetic waves 200 (represented as solid lines emanating from the emitter 114) can radiate through the opening 132 and into the emission section 130. The source electromagnetic waves 200 can be guided through the emission section 130 by the divider 120 and the inner surface of the housing 100 and can radiate generally towards the opening 134. An object 210 that is detectable by the sensor 110, such as a sheet of paper, can be present within the range of the sensor 110 (i.e. a distance between the sensor 110 and the object 210 at which the sensor 110 can still detect the object 210). An exemplary range of the sensor can be as far as about 20 millimeter or about 30 millimeters. The source electromagnetic waves 200 radiating through the emission section 130 can impinge upon and can be reflected by the object 210 in the form of reflected electromagnetic waves 220 and 222 (represented as dashed lines emanating from the object 210).

Some of the reflected electromagnetic waves 220 can be reflected to radiate back through the emission section 130, while some of reflected electromagnetic waves 222 can be reflected into the reception section 140. The reflected electromagnetic waves 222 can be guided through the reception section 140 by the divider 120 and the inner surface of the housing 100. The reflected electromagnetic waves 222 radiating through the reception section 140 can be guided so that the reflected electromagnetic waves 222 radiate generally towards the opening 142 at the proximate end 102 of the housing. At least a portion of the reflected electromagnetic waves 222 can pass through the opening 142 to impinge upon the receiver 116. In response to receiving reflected electromagnetic waves 222 with the receiver, the sensor 110 can generate a signal to indicate that there is an object present.

Referring to FIG. 3, exemplary embodiments are configured to substantial prevent false positive detection by the sensor 110. Contaminants 300, such as paper dust, can accumulate around the housing 100 to interfere with, but not block, the openings 134 and 144 of the housing 100. The contaminates 300, such as paper dust, can accumulate in the emission section 130, which can result in some of the source electromagnetic waves impinging upon the contaminates 300. The source electromagnetic waves 210 that impinge on contaminates 300 can be reflected back into the emission section 130 as reflected electromagnetic waves 220. However, no reflected electromagnetic waves are reflected into the reception section 140 because of the divider 120. Likewise, contaminates 310, such as paper dust, can accumulate in the reception section 140. Such accumulation has no affect on the operation of the sensor 110 because the divider 120 prevents the source electromagnetic waves 210 from reaching contaminants 310, so no reflect electromagnetic waves are created.

Figure 4:
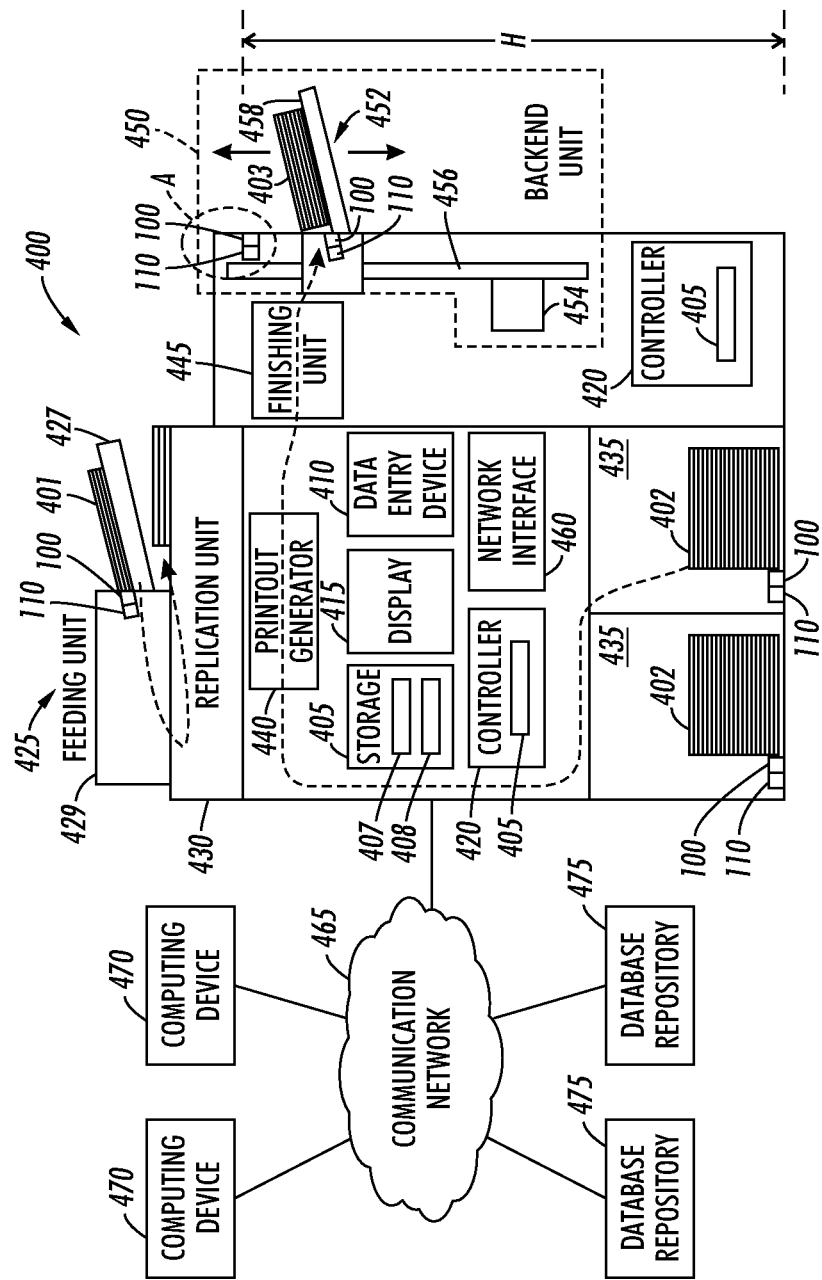
FIG. 4 depicts an exemplary system in which a housing and sensor can be implemented in accordance with exemplary embodiments.

FIG. 4 depicts an exemplary replicating system 400 (hereinafter "system 400") in which the housing 100 and sensor 110 can be implemented. The system 400 can be a printer, copier, scanner, facsimile machine, and/or the like, and can be used to print, copy, scan, receive or send facsimiles, or otherwise replicate information. In the illustrated embodiment, the system 400 can include storage 405, data entry devices 410, display 415, one or more controllers 420, at least one feeding unit 425, at least one replicating unit 430, one or more substrate media holders 435, a printout generator 440, at least one finishing unit 445, and at least one backend unit 450.

Storage 405 can hold information, such as applications 407 used for controlling the operation of the system 400 or information 409 resulting from the operation of the system 400. The applications 407 can include instructions for implementing those embodiments described herein. In some embodiments, storage 405 can be incorporated into one or more of the controllers 420. The storage 405 can include such technologies as a floppy drive, hard drive, tape drive, Flash drive, optical drive, read only memory (ROM), random access memory (RAM), and the like. The storage 405 can be resident in the system 400 and/or can be remote to the system 400.

The data entry device(s) 410, such as a keyboard, touch screen, and/or mouse, can be provided to allow the user to interact with the system 400. For example, the user can be provided with options, which can be rendered on the display 415, regarding the function he wishes to carry out with the system 400, such as copying, scanning, printing, generating a facsimile, and the like. The user can also be provided with other options regarding, for example, a number of copies to be made, a quality of reproduction, whether to replicate in color, grayscale, or black and white, a type of paper to be used, etc.

The one or more controllers 420 (hereinafter "controllers 420") can control the operation of the system 400 based on, for example, the applications 407 in storage 405 and/or an input from the user. The controllers 420 operate to run the application in storage 405 by performing the instructions therein and storing data resulting from the performed instructions, which may be presented to a user via display 415, one or more print outs, and the like.

The feeding unit 425 can include a tray 427, a loading mechanism 429, and the housing 100 and sensor 110 that can be controlled by controllers 420. When a user wishes to replicate information already rendered on a tangible medium 401, such as one or more sheets of paper, the feeding mechanism 425 can operate to automatically feed the tangible medium 401 through the replication unit 430 in response to, for example, an input from a user. Alternatively, or in addition, the user can manually provide the replicating unit 430 with the tangible medium 401. To achieve automatic feeding, the housing 100 and sensor 110, which can be positioned in proximity to the tray 427 so that source electromagnetic waves radiated by the emitter are radiated through the emission section of the housing 100 and towards a location where the tangible medium would be if the tray 427 was holding the tangible medium 401. If the tangible medium 401 is present, the source electromagnetic waves are reflected to form reflected electromagnetic waves, which can radiate from the distal end of the housing towards the proximate end of the housing. At least some of the reflected waves can radiate through the reception section and impinge on the receiver of the sensor 110.

When the receiver receives the reflected waves, the receiver can send a signal, such as an electric or optical signal, to at least one of the controllers 420, which in response can operate the feeding mechanism to pass the tangible medium 401 through the replication unit 430 using the loading mechanism. When no tangible medium 401 is present, no action may be taken by the system 400 or the system 400 may provide a message to the user via the display 415.

The replicating unit 430 can perform electrostatographic replication using electrostatically charged patterns, xerographic replication using a resinous powder on an electrically charged plate, digital imaging replication using one or more charge coupled devices (CCDs) sensors and/or one or more Complimentary Metal Oxide Semiconductor (CMOS) imagining sensors, or other replicating techniques. The replication unit 430 replicates the information on tangible medium 401 and can store the replicated information in storage 405, send the replicated information to the printout generator 440 and/or display 415.

The substrate media holders 435 (hereinafter "holders 435") can holds stacks of substrate media 402, such as paper or other suitable substrate media, which can be used for generating printouts 403. The substrate media can follow a paper path to generate a printout. The holders 435 can include the housing 100 and sensor 110 to monitor the level of the stack of paper. For example, the housing 100 and the sensor 110 can be positioned near or at the bottom of the stack so that when the stack is depleted, the sensor 110 can detect the absence of substrate media in the holders 435 via the housing 100, as described herein. When an absence of substrate media 402 is detected, the sensor 110 can send a signal to one or more of the controllers 420, which can, for example, render a message on the display 415 to indicate that the stack of substrate media 402 in at least one of the holder 435 is depleted.

When a user wishes to generate a printout 403 based on, for example, information replicated by the replicating unit 430, information stored in storage 405, information received from a computing device over a network, or the like, one or more substrate media 402 from the stack can be passed through the printout generator 440, which generates one or more printouts related to the replicated information.

The finishing unit 445 can receive one or more print outs from the print out generator 440 and can perform at least one finishing operation with the one or more printouts 403. Some exemplary finishing operations can include collating, hole punching, stapling folding, saddle-stitching or binding, inserting tabs or sheets between printouts 403, and the like. After the printouts 403 pass through the finishing unit 445, the printouts 403 can be held by the backend unit 450.

The backend unit 450 can include a positioning mechanism 452 and one or more sensors 110 and housings 100. The positioning mechanism 452 includes an actuator 454, a shaft 456, and a tray 458. Some exemplary actuators can be an electric motor, pneumatic actuator, hydraulic actuator, or the like. Printouts 403 that pass through the system 400 can be held in the tray 458 until, for example, the user removes the printouts 403. The positioning member 452 can be controlled by at least one of the controllers 420 to adjust the height of the paper tray 458.

The paper tray 458 can be operatively coupled to the shaft 456 so that the position of the tray 458 on the shaft 456 can be adjusted. The tray 458 can be position along the shaft 456 to change the height of the tray 458. In some embodiments, a pulley system can be implemented for adjusting the height of the tray 458.

The tray 458 can have the sensor 110 and housing 100, as described above, disposed thereon for detecting whether one or more printouts 403 are being held by the tray 458. The sensor 110 and housing 100 can be positioned so that source electromagnetic waves radiate towards a location where a printout would be held on the paper tray 458 if the tray was holding a printout. If no printouts are detected by the sensor 110 via the housing 100, the tray is adjusted to an initial height. If a printout are detected by the sensor 110 via the housing 100, the height of the tray 458 can be controlled based on the height of the stack of printouts.

The backend unit 450 can include the sensor 110 and housing 100 (location A in FIG. 4) positioned at a specified height H so that once the stack of print outs held by the tray 458 increases in height to the specified height H the sensor 110 detects the printouts via the housing 100 and can send a signal to at least one of the controllers 420 indicating that the print out stack has reached a height at which the sensor can detect. In response, the one or more controllers 420 can control the actuator 454 to move the tray 458 lower on the shaft 456. The tray 458 can be adjusted by a predetermined distance. For example, the tray can adjust by the thickness of about one or more printouts.

In some embodiments, the system 400 can include a network interface 460 to facilitate communication, over a communications network 465, with one or more computing devices 470 and/or one or more databases/repositories 475. The system 400 can store information in, or retrieve information from, the one or more databases/repositories 475 and/or can send information to, or receive information from, the one or more computing devices 470. Exemplary computing devices 470 can include a mainframe, personal computer (PC), laptop computer, workstation, handheld device, such as a PDA, or the like.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A system for replicating information comprising:
   a reflective-type sensor for detecting whether an object is present, the reflective-type sensor having an emitter for radiating a source electromagnetic wave and a receiver for receiving a reflected electromagnetic wave related to the source electromagnetic wave;
   a housing having a divider forming a physical wall that separates a continuous hollow cavity within the housing into an emission section for source electromagnetic wave radiation which extends along a first longitudinal axis and a reception section for reflected electromagnetic wave radiation which extends along a second longitudinal axis, said first and second longitudinal axes being generally parallel, the divider being formed to reflect the source electromagnetic wave radiation and the reflected electromagnetic wave radiation, a distal end of the housing extending beyond a distal edge of the divider to form a common area between the emission section and the reception section within the continuous hollow cavity of the housing configured to permit passage therethrough of electromagnetic wave radiation between the emission section and the reception section, said common area being configured such that the source electromagnetic wave radiation may impinge upon the object in the reception section, the divider preventing the source electromagnetic wave and the reflected electromagnetic wave from passing therethrough to mitigate false detection by the receiver of the reflected electromagnetic wave resulting from the source electromagnetic wave impinging on and being reflected by a contaminant within the distal end of the housing and to permit detection of the object adjacent to the distal end of the housing; and
   a support mechanism for holding the object,
   wherein the sensor is disposed at a proximate end of the housing, the source electromagnetic wave emitted by the emitter radiating through the emission section towards a distal end of the housing, the housing being positioned with respect to the support mechanism so that the source electromagnetic wave radiates towards an expected location of the object.

2. The system of claim 1, wherein the system replicates information using at least one of electrostatographic replication, xerographic replication, and digital imaging replication.

3. The system of claim 1, wherein the support mechanism comprises a print out tray for holding a stack of print outs that includes at least one print out, the print out tray being adjustably positioned based on a height of the stack of print outs, the height of the stack of printouts being detected by sensor via the housing.

4. The system of claim 1, wherein the housing extends at least about 1 millimeter beyond the distal edge of the divider.

5. The system of claim 1, wherein the housing extends as much as about 6 millimeters beyond the distal edge of the divider.

6. The system of claim 1, wherein the divider has a thickness of about 1.5 millimeters.

7. The system of claim 1, wherein the source electromagnetic wave comprises infrared radiation suitable for detecting paper.

8. The system of claim 1, wherein the support mechanism comprises a substrate media holder that holds a substrate media to be used for generating printouts, the sensor detecting via the housing whether the stack is depleted.

9. The system of claim 1, wherein the sensor is positioned external to a cavity of the housing and the divider is disposed within the cavity of the housing.

10. A method of detecting objects comprising:
    radiating source electromagnetic waves through an emission section of a housing, the emission section extending along a first longitudinal axis, the source electromagnetic waves being guided through the emission section by at least a divider forming a physical wall that separates a continuous hollow cavity within the housing and is formed to reflect the source electromagnetic waves that impinge thereon, a distal end of the housing extending beyond a distal edge of the divider to form a common area between the emission section and the reception section within the continuous hollow cavity of the housing configured to permit passage therethrough of electromagnetic wave radiation between the emission section and the reception section, the common area being configured such that the source electromagnetic waves may impinge upon an object in the reception section, the divider preventing the source electromagnetic waves from passing through the divider;
    determining whether an object is present on a support mechanism based on whether reflected electromagnetic waves are received through a reception section of the housing, the reception section extending along a second longitudinal axis generally parallel to the first longitudinal axis, the reflected electromagnetic waves being guided through the reception section by at least the divider; and
    performing at least one of adjusting a height of the support mechanism based on a determination of whether the object is present or indicating that the object is depleted based on a determination of whether the object is present.

11. The method of claim 10, further comprising adjusting the height of the support mechanism to an initial height based on a determination that the object is not present.

12. The method of claim 10, further comprising adjusting the height of the support mechanism to a lower height based on a determination that the object is present.

13. The method of claim 10, wherein the divider is formed of black acrylonitrile-butadienestyrene (ABS) plastic.

14. The method of claim 10, wherein the housing extends beyond the divider by at least about 1 millimeter.

15. The method of claim 10, wherein the housing extends beyond the divider by as much as about 6 millimeters.

16. The method of claim 10, wherein the divider has a thickness of about 1.5 millimeters.

* * * * *